United States Patent [19]

Sakurada et al.

[11] Patent Number: 4,672,432
[45] Date of Patent: Jun. 9, 1987

[54] METHOD FOR RECORDING A COLOR IMAGE USING DOTS OF COLORANTS OF DIFFERENT DENSITIES

[75] Inventors: Nobuaki Sakurada, Yokohama; Hideaki Kawamura; Takashi Sasaki, both of Tokyo, all of Japan

[73] Assignee: Canon Kabushiki Kaisha, Tokyo, Japan

[21] Appl. No.: 602,732

[22] Filed: Apr. 23, 1984

[30] Foreign Application Priority Data

Apr. 28, 1983 [JP] Japan .................................. 58-75858
Jan. 24, 1984 [JP] Japan .................................. 59-10545

[51] Int. Cl.$^4$ ........................ H04N 1/46; G03F 3/08; G01D 15/16; G01D 15/18
[52] U.S. Cl. ........................................ 358/75; 358/80; 346/140 R
[58] Field of Search .................. 358/75, 75 IJ, 78, 80, 358/283, 298; 346/140 PD

[56] References Cited

U.S. PATENT DOCUMENTS

| | | | |
|---|---|---|---|
| 3,961,306 | 6/1976 | Anstey | 346/107 SC |
| 4,108,654 | 8/1978 | Goren | 430/7 |
| 4,272,771 | 6/1981 | Furukawa | 346/75 |
| 4,313,684 | 2/1982 | Tazaki et al. | 346/75 |
| 4,412,225 | 10/1983 | Yoshida et al. | 358/75 IJ |
| 4,412,226 | 10/1983 | Yoshida | 346/75 |
| 4,560,997 | 12/1985 | Sato et al. | 358/298 |
| 4,580,150 | 4/1986 | Tazaki | 346/140 PD |
| 4,604,654 | 8/1986 | Sakurada et al. | 358/75 |

FOREIGN PATENT DOCUMENTS

| | | | |
|---|---|---|---|
| 156264 | 9/1982 | Japan | 358/75 IJ |
| 41969 | 3/1984 | Japan | 358/283 |
| 52658 | 3/1984 | Japan | 358/75 IJ |

Primary Examiner—James J. Groody
Assistant Examiner—Randall S. Svihla
Attorney, Agent, or Firm—Fitzpatrick, Cella, Harper & Scinto

[57] ABSTRACT

A method for reproducing a halftone color image is disclosed, in which each picture element comprises a plurality of cells and one dot is formed for each cell. At least two colorent densities are used for at least some of the colors. When there is more than one combination of colorants which can represent a given density in a picture element, the combination having the largest number of dots is selected. In a preferred embodiment, more colorants of different densities are used for cyan and magenta then are used for black and yellow.

13 Claims, 6 Drawing Figures

METHOD FOR RECORDING A COLOR IMAGE USING DOTS OF COLORANTS OF DIFFERENT DENSITIES

BACKGROUND OF THE INVENTION

1. Field of the Invention

The present invention relates to a method for reproducing a halftone by controlling the number of dots in one picture element or a so-called density modulation system, and more particularly to a method for reproducing a halftone image by using a plurality of dots of different densities. The present invention also relates to a method for reproducing a halftone image capable of reproducing a color image.

2. Description of the Prior Art

In prior-art, density modulation methods for reproducing a halftone image by controlling the number of dots in one picture element, such as a dither method or a density pattern method, dots having the same density are used.

For example, one picture cell comprises 3×3=9 cells and each cell can contain one dot. Accordingly, ten tone levels (including non-dot pattern) are possible. However, a high quality of image cannot be reproduced with ten tone levels. Thus, the number of cells may be increased but this results in the increase of the size of picture cell and a reduction in resolution.

It has been proposed to use a systematic dither method without increasing the number of cells to reproduce multiple tone levels. However, in such a systematic dither method, a pseudo-pattern may be generated or image density may be coarsened at a highlight area and hence a high quality image cannot be obtained.

In order to resolve the above problems, it has been proposed to increase the number of densities of the colorant to obtain a wide range of tonality. As the number of densities increases, the reproduction range of the tonality is widened and the pseudo contour due to a difference between the densities can be prevented.

However, the number of heads increases accordingly, the signal processing circuitry becomes complex and a cost of the device increases. Further, the increase in the number of heads leads to the reduction of a reliability.

Thus, while the use of as many colorants as possible having different densities for one color is desirable to improve the image quality, the use of as few colorants as possible is desirable from the standpoints of cost and reliability.

SUMMARY OF THE INVENTION

It is an object of the present invention to provide a method for reproducing a halftone which allows the reproduction of a large number of tone levels without increasing the number of cells of one picture element and the reproduction of a high quality of image at a highlight area.

It is another object of the present invention to provide a color image forming method which allows the reproduction of a sufficiently satisfactory quality of image and is practical from the standpoints of the cost and the reliability.

The above and other object of the present invention will be apparent from the following description of the invention taken in conjunction with the accompanying drawings.

DETAILED DESCRIPTION OF THE PREFERRED EMBODIMENTS

In a first embodiment of the present invention, in order to achieve the above objects, high density and low density dots are used and one picture element comprises a 3×3 matrix. It is assumed that the sizes of the high density dots and the low density dots are equal, and a reflective optical density of a picture element containing four low density dots and a reflective optical density of a picture element containing one high density dot are equal. Thus, the following tone levels can be reproduced.

| Tone level | Number of Low Density Dots | Number of High Density Dots |
| --- | --- | --- |
| 0 | 0 | 0 |
| 1 | 1 | 0 |
| 2 | 2 | 0 |
| 3 | 3 | 0 |
| 4 | 4/0 | 0/1 |
| 5 | 5/1 | 0/1 |
| 6 | 6/2 | 0/1 |
| 7 | 7/3 | 0/1 |
| 8 | 8/4/0 | 0/1/2 |
| 9 | 9/5/1 | 0/1/2 |
| 10 | 6/2 | 1/2 |
| 11 | 7/3 | 1/2 |
| 12 | 8/4/0 | 1/2/3 |
| 13 | 5/1 | 2/3 |
| 14 | 6/2 | 2/3 |
| 15 | 7/3 | 2/3 |
| 16 | 4/0 | 3/4 |
| 17 | 5/1 | 3/4 |
| 18 | 6/2 | 3/4 |
| 19 | 3 | 4 |
| 20 | 4/0 | 4/5 |
| 21 | 5/1 | 4/5 |
| 22 | 2 | 5 |
| 23 | 3 | 5 |
| 24 | 4/0 | 5/6 |
| 25 | 1 | 6 |
| 26 | 2 | 6 |
| 27 | 3 | 6 |
| 28 | 0 | 7 |
| 29 | 1 | 7 |
| 30 | 2 | 7 |
| 31 | — | — |
| 32 | 0 | 8 |
| 33 | 1 | 8 |
| 34 | — | — |
| 35 | — | — |
| 36 | 0 | 9 |

In the above table, in order to represent the same density or the same tone level in the tone levels 0–36, all possible combinations are shown where more than one control method exists.

Figure 1:
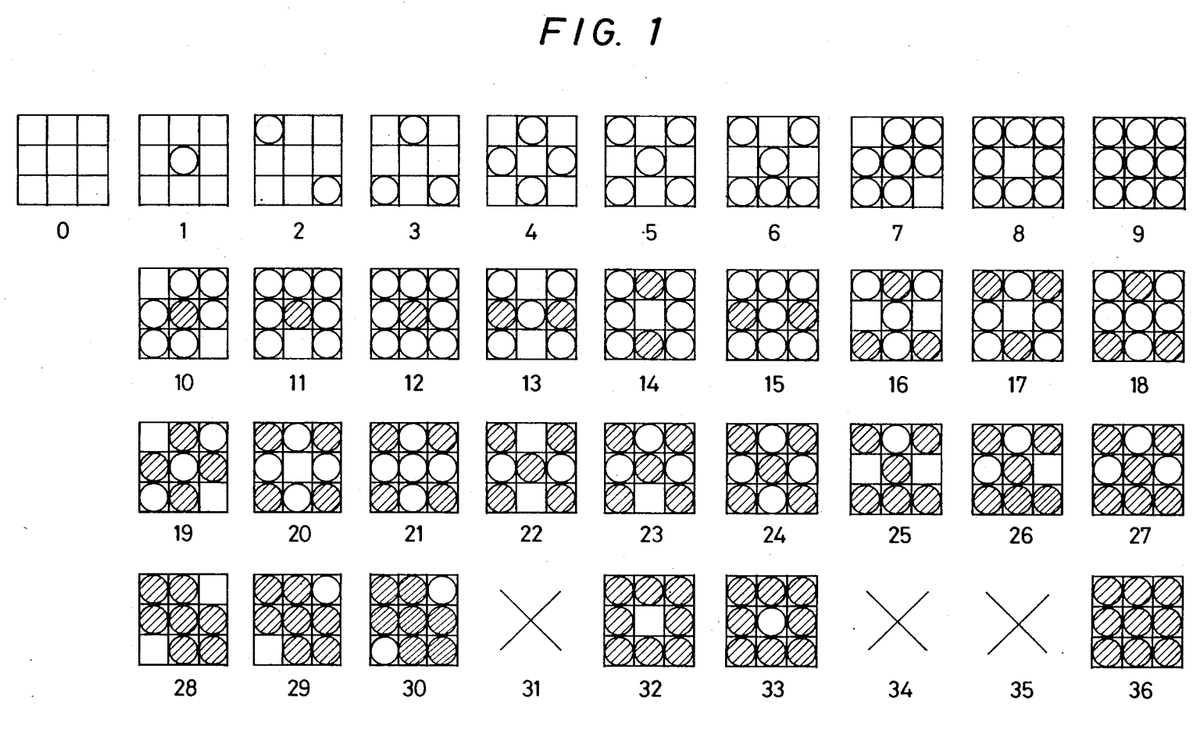
FIG. 1 shows dot patterns for respective tone levels.

Of the tone levels listed above, those used to reproduce the image in the present embodiment are shown in FIG. 1, in which ○ indicates a low density dot and ● indicates a high density dot.

For example, the tone level 4 may be represented by either four low density dots or one high density dot. It is represented by four low density dots in the present embodiment. In this manner, the pattern is selected such that as many dots as possible are included in one picture element so that a white area is reduced and the low density dots are always selected at the highlight area and the high density dots do not scatter at the highlight area. Accordingly, roughness in the image which has been a problem encountered in the prior art is avoided and a soft image is obtained.

The tone levels 31, 34 and 35 are unreproducible in the present embodiment, but since they are in the high density patterns, they do not affect the image quality very much. A sufficient linearity is assured for the low density patterns which significantly affect the image quality.

The present invention is applicable to various recording methods such as ink jet recording, thermal transfer recording and electrostatic recording. An application to the ink jet recording is described below.

Figures 2, 3:
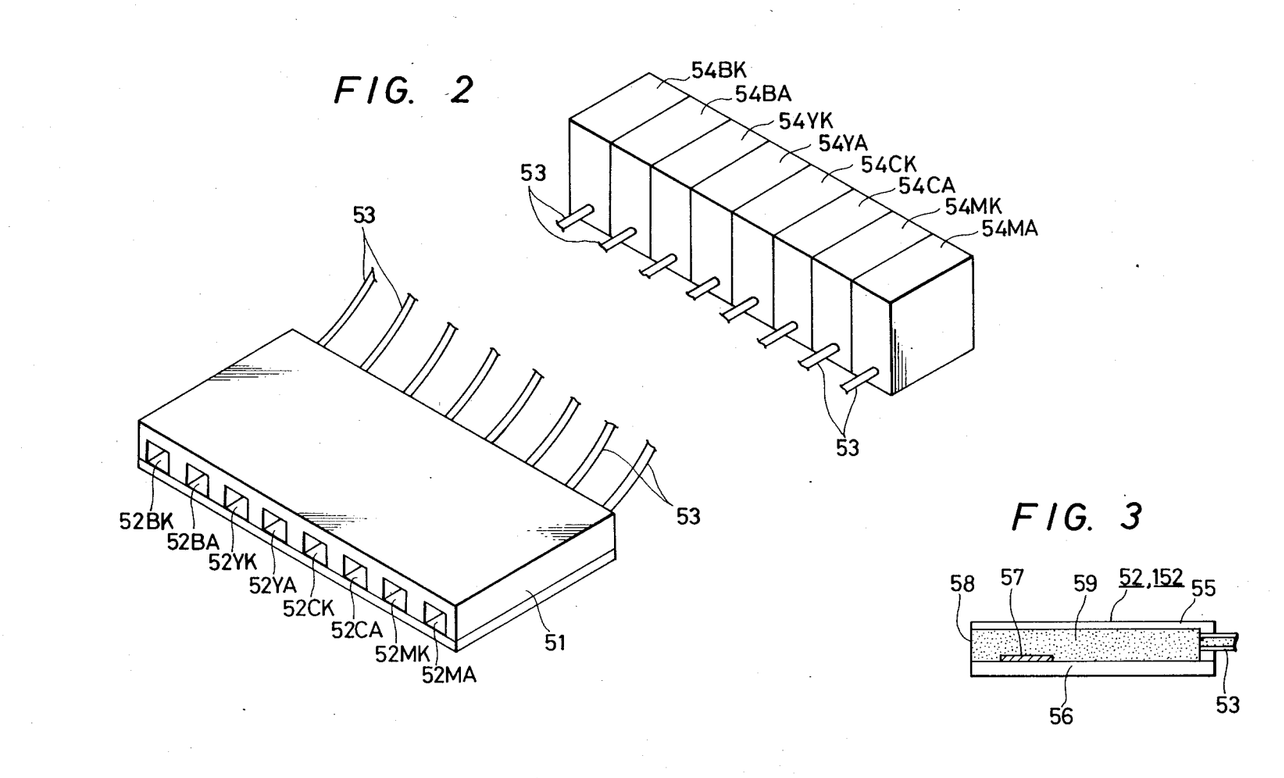
FIG. 2 is a perspective view in a vicinity of a head of an ink jet recorder in accordance with a first embodiment.
FIG. 3 is a sectional view of a nozzle 52.

FIG. 2 shows a perspective view of a head of an ink jet recorder which uses a heating element.

In FIG. 2, numeral 51 denotes a head unit which has eight nozzles 52. The head unit 51 has two nozzles for each of black, yellow, magenta and cyan, such as a high density black ink discharge nozzle 52BK, a low density black ink discharge nozzle 52BA and a high density yellow ink discharge nozzle 52YK. Numeral 53 denotes an ink supply tube and numeral 54 denotes a main tank. A total of eight main tanks, one for each nozzle, are provided.

A structure of the nozzle 52 is explained with reference to FIG. 3. Numeral 55 denotes a top plate, numeral 56 denotes a bottom plate, numeral 57 denotes the heating element, numeral 58 denotes an orifice and numeral 59 denotes an ink.

When a voltage is applied to the heating element 57, it generates heat and bubbles are formed around the element 57. When the application of the voltage is terminated, the bubbles shrink. As the bubbles are formed and shrink, the ink around the orifice 58 is discharged from the orifice 58.

Figure 4:
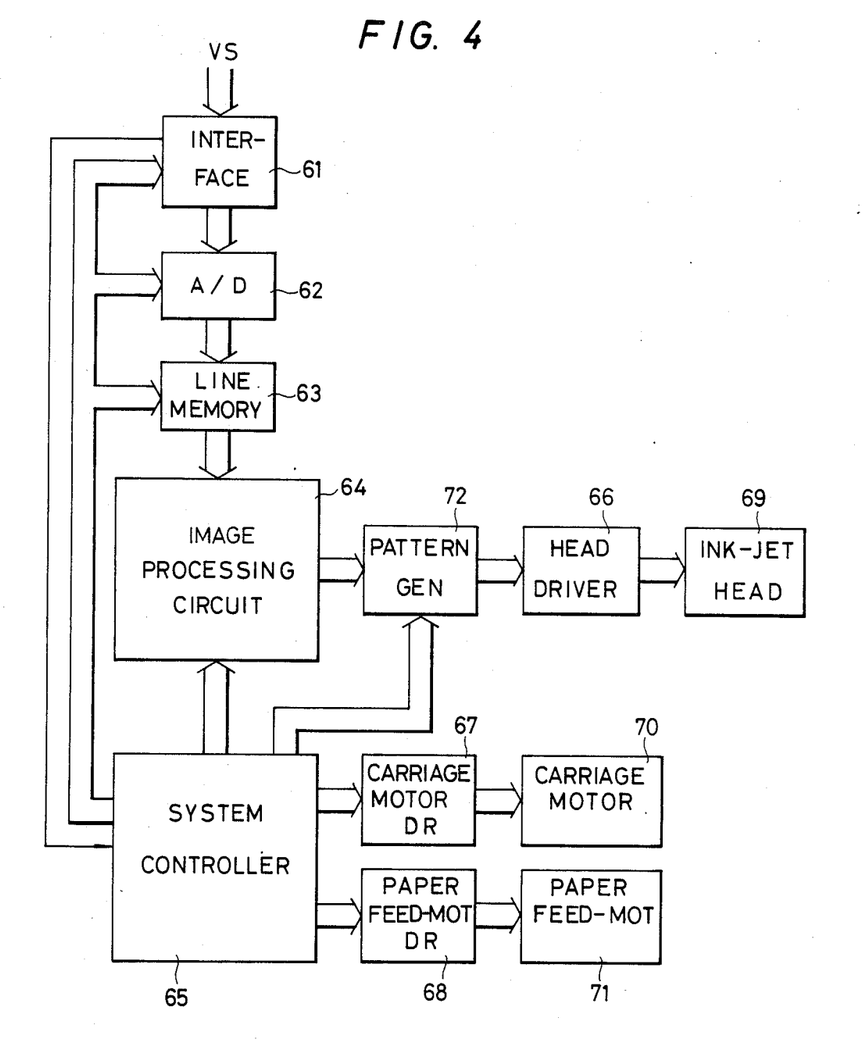
FIG. 4 is a control block diagram of the ink jet recorder.

A control block diagram of a printer which incorporates the ink jet head of FIG. 2 is shown in FIG. 4. The operation thereof is explained below.

A video signal VS including R, G, B color signals and a synchronizing signal is applied to an interface 61. The interface 61 carries out a γ-transform and a color correction of the color signals as required, and samples and holds the color signals by an internal sample-hold circuit in response to the synchronizing signal. The sampled and held color signals are converted to digital signals by an A/D converter 62 and the digital color signals are stored in a line memory 63 by an appropriate number of lines.

The data in the line memory 63 are then processed by an image processing circuit 64 for color conversion, γ-transform, masking and background elimination for each picture element, and converted to cyan, magenta, yellow and black recording color signals. The recording color signal is a digital signal comprising several bits representing a tone level. It is applied to a pattern generator 72 which generates a pattern as shown in FIG. 1 in accordance with an input digital signal thereto. The pattern signal is supplied to a head driver 66 which drives an ink jet head 69 corresponding to the heating element 57 of FIG. 3.

On the other hand, a system controller 65 which controls the sequence of the printer issues a head drive signal, a carriage motor drive signal and a paper feed signal in timed relation with the input video signal VS, and they are supplied to the head driver 66, a carriage motor driver 67 and a paper feed motor driver 68, respectively, so that the ink jet head 69, a carriage motor 70 and a paper feed motor 71 are controlled at the predetermined timing to transfer the reproduced image of the input video signal to a record medium.

A second embodiment of the present invention is now explained. In the present embodiment, in order to achieve the above objects, single density dots are used for the yellow and black colorants and dual-density dots are used for the cyan and magenta coloring materials.

As is well known, the resolution power of a human eye varies from color to color. The higher the resolution for a particular color, the more recognizable is a dot of that color, even if it is small, and the harder it is to represent a light tone. The resolution for blue is lower than that for green and red, and cyan, magenta and yellow dominate red, green and blue, respectively. Accordingly, the resolution for yellow is lower than that for cyan and magenta. Accordingly, a light tone can be represented by one density of the yellow colorant. For cyan and magenta, dots are nonuniform even if the density of the dots are low to represent the light tone, if only one density is used. Accordingly, two densities are used for cyan and magenta, respectively, and one density is used for yellow.

For black, the resolution of the human eye is high but only one density need be used for a high density area because a light area can be reproduced by a combination of cyan, magenta and yellow dots.

For yellow, a higher density dot than magenta or cyan light dot is used and the density patterns 0–9 shown in FIG. 1 are used. For black, the high density dot is used and the density patterns 4–9 shown in FIG. 1 are used but the density patterns 0–3 are not used because of "roughness", which refers to the visual effect of widely scattered, high density dots.

A construction of the recorder is now explained.

Figure 5:
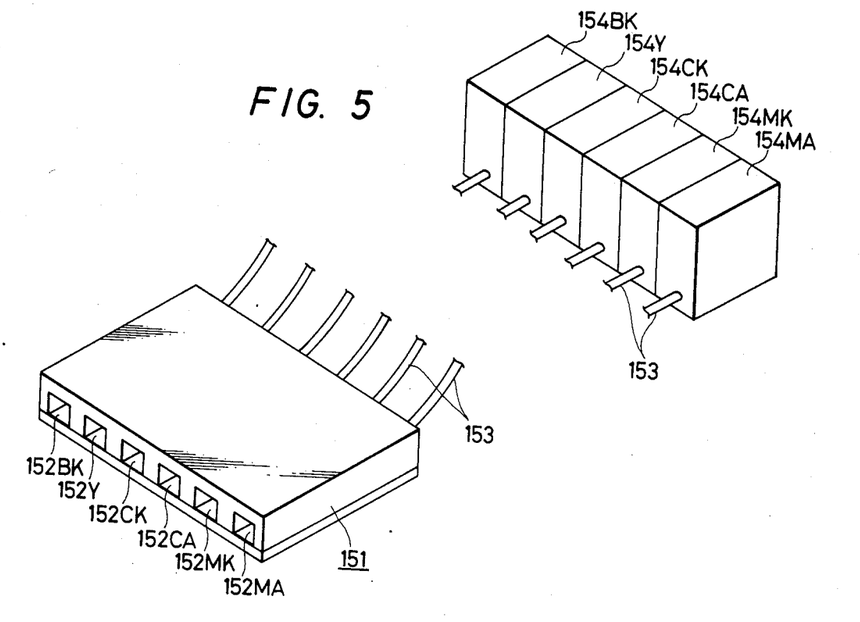
FIG. 5 shows a vicinity of a head of an ink jet recorder in accordance with a second embodiment.

FIG. 5 shows a head of the ink jet recorder which uses a heating element.

In this FIG. 5, numeral 151 denotes a head unit which has six nozzles 152. The head unit 151 has a high density black ink discharge nozzle 152BK, a high density yellow ink discharge nozzle 152Y, and both a high density nozzle and a low density nozzle for each of magenta and cyan. Numeral 153 denotes an ink supply tube, and numeral 154 denotes a main ink tank. Six main ink tanks, one for each nozzle, are provided. The density patterns by the density modulation of the cyan and magenta dots are identical to those shown in FIG. 1.

The arrangement of the nozzles 152 is identical to that shown in FIG. 3 and the operation thereof is identical to that of the first embodiment. A control block diagram for the printer is identical to that shown in FIG. 4.

In this manner, a high quality of color image can be reproduced without significantly increasing the number of heads. Since the cyan, magenta and black high density dots are not used in the highlight area (light area), the roughness of the image is eliminated.

While the pattern generator 72 is used in the present embodiment, a dither processing circuit may be used instead.

Figure 6:
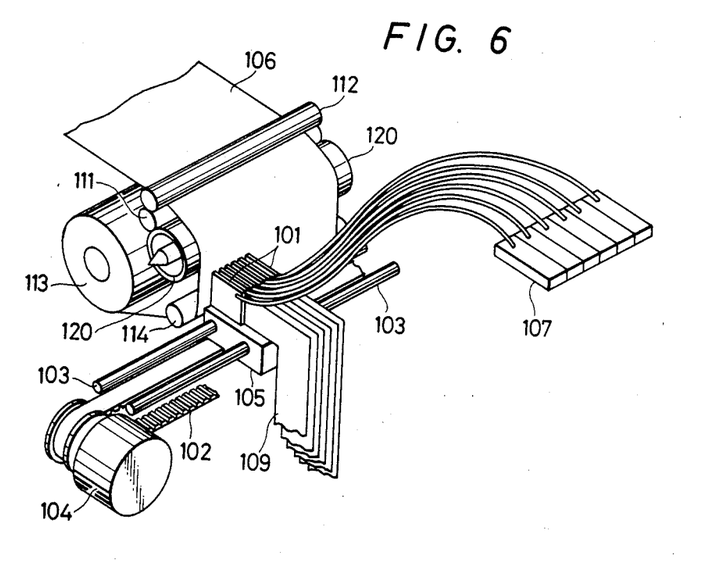
FIG. 6 is a perspective view of an ink jet recorder in accordance with a third embodiment.

While the recorder having one head for each colorant has been shown, a recorder having a number of heads for each colorant as shown in FIG. 6 may be used.

In FIG. 6, numeral 101 denotes a head unit having a plurality of ink jet heads arranged in a subscan direction for each colorant. It has six units, one for each of high density black, high density yellow, high density cyan, high density magenta, low density cyan and low density magenta. Numeral 107 denotes an ink tank for each head unit, numeral 109 denotes signal lines, numeral 104 denotes a carriage drive motor for driving a carriage 105 carrying the head units along a rail 103 in cooperation with a conveyer belt 102, numeral 106 denotes a record paper, numeral 120 denotes a platen, numerals 111 and 112 denote record paper feed rollers, numeral 113 denotes a record paper roll and numeral 114 denotes a guide roller.

While two densities are used for cyan and magenta, respectively, and one density is used for yellow and black, respectively, in the second embodiment, it will be sufficient if more densities are used for cyan and magenta than the number of densities for yellow, for the reasons discussed above.

In the first and second embodiments, the head unit 101 comprises a plurality of ink jet heads which use the heating element shown in FIG. 3. Alternatively, an ink jet head which uses an electro-mechanical transducing means such as a piezo-electric device may be used. As described above, the present invention is also applicable to any dot type recorder other than the ink jet recorder.

As described above, according to the present invention, multiple tone levels can be reproduced without increasing the number of cells in one picture element. Further, since no high density dot is formed in the highlight area, roughness is eliminated and the quality of the image is further improved.

In accordance with the present invention, the numbers $N_C$, $N_M$ and $N_Y$ of the densities (that is, dye concentrations) for cyan, magenta and yellow, respectively, are selected to meet the relation of $N_C$, $N_M > N_Y$. Accordingly, for magenta and cyan, for which the resolution power of the human eye is high, roughness in the highlight area is reduced and a high quality color image is reproduced. Further, since the number of densities for the yellow colorant is smaller than the number of densities for the magenta or cyan colorant, the total number of colorants is reduced and the number of recording heads is reduced. Accordingly, the device is simplified and the reliability is enhanced and the cost is reduced.

The present invention is not limited to the illustrated embodiment but various modifications and variations may be made within the scope of the claim.

What we claim is:

1. A method for recording a color image by using cyan, magenta and yellow colorants, wherein at least said cyan and magenta colorants each comprise colorants of a number of densities, comprising the steps of:
    forming dots of at least one of the colorants in unit areas of the image; and
    controlling the density level of each unit area by selecting the number of dots to be formed in each unit area;
    wherein $N_C$, $N_M$ and $N_Y$ represent the number of densities of the cyan, magenta, and yellow colorants, respectively, and are selected to satisfy the relation $N_M$, $N_C > N_Y$. pg,16

2. A method for recording a color image by using cyan, magenta and yellow colorants according to claim 1, wherein in said controlling step the density level for each unit area is controlled by selecting a particular pattern of dots.

3. A method for recording a color image by using cyan, magenta and yellow colorants according to claim 1, wherein in said controlling step the density level for each unit area is controlled by using a dither technique to select the number of dots to be formed.

4. A method for recording a color image by using cyan, magenta and yellow colorants according to claim 1, wherein $N^Y$ is one.

5. A method for recording a color image by using cyan, magenta and yellow colorants according to claim 1, wherein each unit area comprises a plurality of cells and either one dot or no dot of one density of each colorant is formed in any given cell.

6. A method for recording a color image by using cyan, magenta and yellow colorants according to claim 1, wherein in said forming step said dots are formed on a recording medium by droplets emitted by droplet emitting means.

7. A method for recording a color image by using cyan, magenta and yellow colorants according to claim 6, wherein said droplet emitting means comprises a number of heads for emitting droplets of colorants of different densities and colors, and wherein $N_{HC}$, $N_{HM}$ and $N_{HY}$ represent the number of heads for emitting droplets of cyan, magenta and yellow colorants, respectively, and are selected to satisfy the relation $N_{HC}$, $N_{NM} > N_{HY}$.

8. A method for recording a color image by using cyan, magenta and yellow colorants, wherein at least said cyan and magenta colorants each comprise colorants of a number of densities, comprising the steps of:
    recording the image as a plurality of picture elements, wherein each picture element comprises a plurality of cells;
    selecting the numbers $N_C$, $N_M$ and $N_Y$ of densities of the cyan, magenta and yellow colorants, respectively, to satisfy the relation $N_M$, $N_C > N_Y$;
    forming dots of at least one of the colorants in the cells in accordance with a desired density level for each picture element, wherein dots may be omitted from certain cells to provide the desired density level; and
    selecting a combination of the colorants of the numbers of densities for the dots in a given picture element such that when there is more than one combination which will provide about the same density level for said given picture element, the combination which will result in using the largest number of dots in said given picture element is selected.

9. A method for recording a color image by using cyan, magenta and yellow colorants according to claim 8, wherein in said forming step the density level for each picture element is controlled by selecting a particular pattern of dots.

10. A method for recording a color image by using cyan, magenta and yellow colorants according to claim 8, wherein in said forming step the density level for each picture element is controlled by using a dither technique.

11. A method for recording a color image by using cyan, magenta and yellow colorants according to claim 8, wherein in said forming step either one dot or no dot of one density of each colorant is formed in any given cell.

12. A method for recording a color image by using cyan, magenta and yellow colorants according to claim 8, wherein $N_y$ is one.

13. A method for recording a color image by using cyan, magenta and yellow colorants according to claim 8, wherein in said forming step said dots are formed on recording medium by a droplets emitted by droplet emitting means.

* * * * *

UNITED STATES PATENT AND TRADEMARK OFFICE
CERTIFICATE OF CORRECTION

PATENT NO. : 4,672,432  
DATED : June 9, 1987  
INVENTOR(S) : NOBUAKI SAKURADA, ET AL.

Page 1 of 2

It is certified that error appears in the above-identified patent and that said Letters Patent is hereby corrected as shown below:

AT [57] IN THE ABSTRACT

Line 4, "colorent" should read --colorant--.

COLUMN 1

Line 18, "prior-art, density" should read --prior-art density--.
Line 40, "pseudo contour" should read --pseudo-contour--.
Line 43, "a" should read --the--.
Line 45, "a" should be deleted.
Line 63, "the cost" should read --cost--.
Line 64, "the" should be deleted.
Line 65, "object" should read --objects--.

COLUMN 3

Line 1, " ● " should read -- ⊘ --.

COLUMN 5

Line 56, "claim." should read --claims.--.

COLUMN 6

Line 2, "pg. 16" should be deleted.
Line 15, "$N^y$" should read --$N_y$--.
Line 34, "$N_{NM}>$" should read --$N_{HM}>$--.

UNITED STATES PATENT AND TRADEMARK OFFICE
CERTIFICATE OF CORRECTION

PATENT NO. : 4,672,432

DATED : June 9, 1987

INVENTOR(S) : NOBUAKI SAKURADA, ET AL.

It is certified that error appears in the above-identified patent and that said Letters Patent is hereby corrected as shown below:

COLUMN 8

Line 6, "recording" should read --a recording--.
Line 6, "a droplets" should read --droplets--.

Signed and Sealed this

Twenty-seventh Day of October, 1987

Attest:

DONALD J. QUIGG

Attesting Officer

Commissioner of Patents and Trademarks